BERNARD A. SHOOR
DALE R. BURGER
INVENTORS.

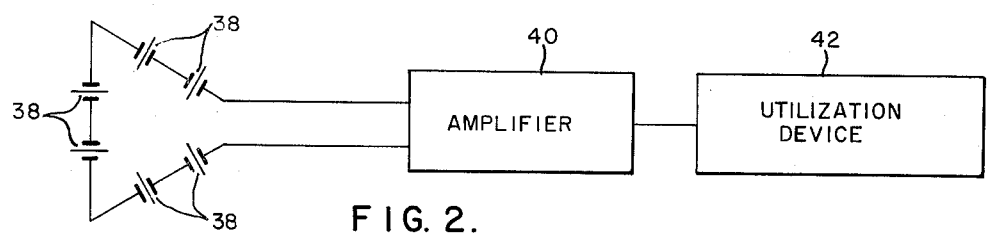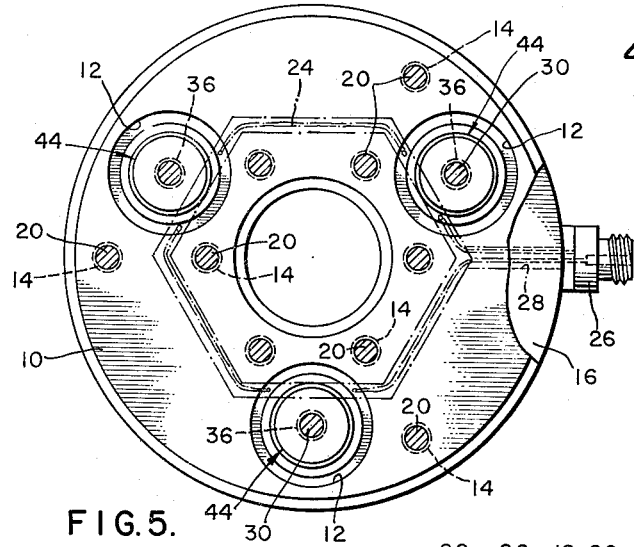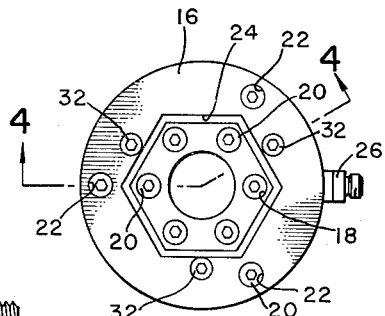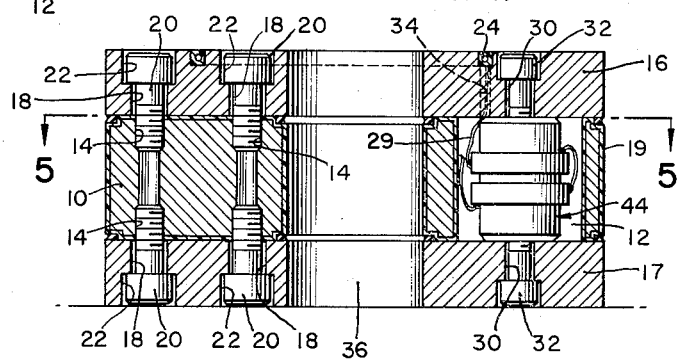

BY Reed C. Lawlor
ATTORNEY.

United States Patent Office 3,210,993
Patented Oct. 12, 1965

3,210,993
ELECTROMECHANICAL TRANSDUCER UTILIZING POISSON RATIO EFFECTS
Bernard A. Shoor, Pasadena, and Dale R. Burger, South Pasadena, Calif., assignors to Endevco Corporation, Pasadena, Calif., a corporation of California
Filed Oct. 27, 1961, Ser. No. 148,135
4 Claims. (Cl. 73—141)

This invention relates to force measuring apparatus and more particularly to force measuring transducers and devices using, as a force responsive element, a body of piezoelectric material.

Electro-mechanical devices for translating mechanical forces into corresponding electrical voltages are well known in the art, as for example, force gauges which are employed for measuring static forces and accelerometers which are widely employed in the testing and design of vibrating machinery and the detection of seismic disturbances. In this invention a force-transducing element is provided that comprises an elastic cylindrical body to which is secured a concentric annular ring of radially polarized piezoelectric material. Forces applied to the ends of the cylinder develop electric forces in the piezoelectric ring. Polarizable polycrystalline dielectric ceramic material such as barium titanate is a suitable material. For convenience, the elastic cylindrical body is sometimes referred to hereinafter as a force-sensing element while the entire unit including the force-sensing element and the piezoelectric ring and other associated mechanical parts are sometimes referred to as a force transducer. The force-sensing element is usually composed of metal such as steel or aluminum so that force-transmitting members through which the force is to be applied to the force-sensing element can be readily secured thereto.

In the simplest embodiment of the invention the force-transmission members are threadably attached to the ends of the force-sensing element so that either compressional forces or tensional forces may be measured. In some prior art devices, piezoelectric elements have been employed for measuring both compressional and tensional forces. In those devices, discs of piezoelectric material have been employed and these discs have been mounted by rather complex mechanisms in order to facilitate a measurement of tensional as well as compressional forces. But with this invention, a simple structure is provided for employing piezoelectric elements to measure forces and accelerations.

One of the objects of this invention is to provide a force-measuring transducer employing a piezoelectric element for converting a force into an electric signal.

Another object of the invention is to produce a force-measuring transducer having a plurality of force-responsive elements arranged in parallel between end plates so as to withstand a large force but which has piezoelectric elements connected in parallel to provide high sensitivity.

Another object of the invention is to provide a force-responsive element in which an anular piezoelectric element mounted on and concentric with a cylindrical force-responsive member is preloaded so as to facilitate measurement of both compressional and tensional forces applied to the ends of the cylindrical body.

Still another object of the invention is to provide a force-measuring transducer which is readily assembled and which is provided with a simple arrangement for interconnecting a plurality of piezoelectric elements mounted therein.

The foregoing and other objects of this invention together with various advantages thereof will become apparent from the following specification taken in connection with the accompanying drawings.

In the drawings:

FIG. 1 is a perspective view of a single annular crystal mounted on a cylindrical body;

FIG. 2 is a schematic electrical diagram of a force transducer embodying this invention connected with an amplifier and a utilization device;

FIG. 3 is a plan view of the force transducer of the present invention;

FIG. 4 is a cross-sectional view of the force transducer taken along the line 4—4 of FIG. 3;

FIG. 5 is a horizontal view taken along the plane 5—5 of FIG. 4;

Figure 6:
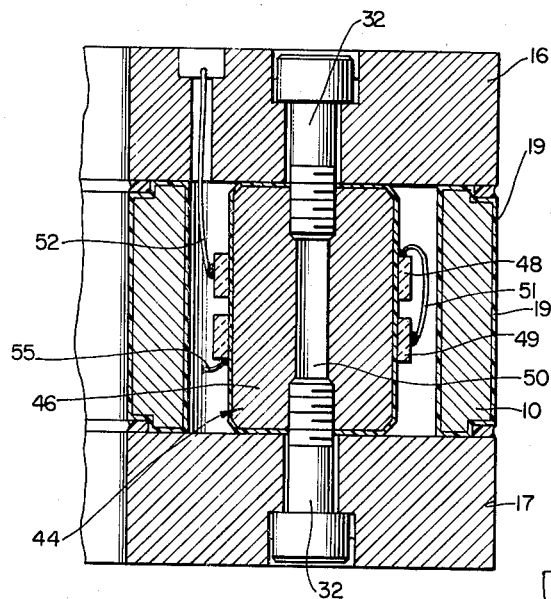
FIG. 6 is an enlarged vertical sectional view of one embodiment of the present invention.

In the drawings, there are illustrated specific force-measuring devices embodying various features of the present invention. The force-measuring device of this invention comprises a plurality of cylindrical force-sensing elements mounted in supporting structure. When a force is applied to the supporting structure, it is transmitted to the force-sensing elements. Each force-sensing element in turn transmits the force to a pair of piezoelectric elements which are in the form of annular rings under tension mounted on the force-sensing elements and concentric therewith. The force-sensing elements convert the axial linear forces applied to them into radially acting forces suitable for actuating the annular rings of piezoelectric material to produce electrical signals therefrom. The resultant electrical signals vary in proportion to the changes in the magnitude of the forces.

The conversion from a linear force to a radial force is an example of the principles of static elasticity embodying the concept of Poisson's ratio. It is well known that when external forces are applied to a solid elastic body, such a body will be deformed when the particles of which the body is composed are displaced relatively to each other. The quantities which measure these relative displacements are called strains. Generally speaking, due to the solid character of such a body, a force that causes the body to be compressed along one axis, causes the body to expand along another axis.

Consider the deformation occurring when a solid cylindrical elastic bar of original length $l_0$, and a diameter $d_0$ is subjected to simple compression or tension. The applied forces cause a change in length to $l_1$ and the ratio of the change in length, $l_1 - l_0$, to the original length, $l_0$ is known as the longitudinal strain. Thus, the longitudinal strain is defined as the change of length per unit of original length. It is positive if the applied force is a tension and negative if the applied force is a compression. The original cross section dimension $d_0$ is changed to $d_1$ and the transverse component of strain is thus defined as the ratio of the change in linear cross section dimension to the original linear cross section dimension.

For most materials, it is found experimentally that the ratio of transverse to longitudinal strain is negative and relatively constant. This constant which varies somewhat from one material to another is called "Poisson's ratio" and generally lies between a value of one-quarter and one-half. For metals it is about one-third.

Referring to FIG. 1 the value of Poisson's ratio given above indicates that when compressive forces A are applied to the ends of a cylinder S composed of a solid elastic material, such as aluminum, a radial force B is produced within the cylinder which tends to increase the cross sectional area of the cylinder indicated in FIG. 1. When an annular ring or collar X composed of an elastic material, such as a piezoelectric material, embraces the cylinder S snugly, the expansion of the cylinder is resisted, but not entirely prevented, thus causing a force to be applied to the ring. This force acts radially outwardly at all points on the curved surface of the cylinder. Thus, a simple cylinder composed of a solid elastic material may be used to convert an axial linear force to a radial force. In the present invention this force conversion principle is utilized to actuate an annular piezoelectric element X mounted on such a cylinder. With this invention the radial force B supplied by the cylinder creates a tension C along the circumferential length of the annular crystal mounted on the cylinder and this tension causes a radially directed electrical force E to be generated between the two cylindrical surfaces of the crystal.

Turning now to FIGS. 3, 4, and 5, there is shown a force transducer including a supporting structure for a plurality of force transducing elements used to produce an electrical indication of the forces applied to said supporting structure. The supporting structure comprises a cylindrical member or spacer 10 adapted to receive said force transducing elements in cavities 12 formed therein. The cylindrical member 10 is further provided with a plurality of threaded holes 14 each adapted to receive assembly or mounting screws 20. The threaded holes 14 are provided for the purpose of securing a pair of end plates 16 and 17 to the spacer 10. The end plates 16 and 17 are provided with a plurality of holes 18 each adapted to receive a screw 20 extending therethrough into a threaded hole 14 for assembling the end plates 16 and 17 and the spacer 10. The holes 18 are each provided with an enlarged portion 22 adapted to receive the heads of the screws 20 so that the outer surfaces of the end plates 16 and 17 present smooth surfaces.

The cylindrical portion 10 and the end plates 16 and 17 may be made of aluminum or other suitable material. All of the outer surfaces of the cylindrical portion 10 have been anodized to provide a thin insulating coating 19 to prevent unwanted electrical continuity between different mechanical parts of the device.

One end plate 16 is provided with a hexagonal groove or recess 24 which is adapted to receive electrical conductors. This end plate is further provided with a radially extending electrical terminal 26 which is connnected to the hexagonal recess 24 by a hole 28 in the end plate 16 which permits the extension of electrical conductors from the hexagonal recess 24 to the terminal 26. The hexagonal recess 24 is sealed by a body of epoxy which protects and secures electrical wires in the recess 24 and forms a smooth surface flush with the outer surface of the end plate 16. Each of the end plates 16 and 17 is further provided with three holes 30 for receiving a plurality of mounting screws 32 for holding the force sensing elements in place. The enlarged portions of the holes 30 are of such a depth that the heads of the screws 32 lie below the surface of the end plates 16 and 17. The end plate 16 is further provided with three holes 34 providing vertical access between the interior of the cylindrical portion 10 and the recess 24. Thus electrical conductors 29 connected to the force-transducing elements may be drawn through the holes 34 into the recess 24, through the hole 28, to the terminal 26 and electrical connection made between the force-transducing elements and an amplifier.

A hole 36 provided in the center of the force transducer extends through the end plates 16 and 17 and through the spacer 10. A screw 37 projecting through the hole 36 may be employed to mount the force-measuring device between two objects between which a force is to be measured.

In FIG. 2, an electrical schematic diagram shows the manner of use of the force-measuring device. In the particular embodiment shown, three force-transducing elements have been represented. As has been stated above, each of the force-transducing elements contains a pair of piezoelectric annular rings. Though the crystals may be connected in other ways, in the present embodiment a total of six piezoelectric annular rings are shown connected in series. The use of a plurality of piezoelectric elements increases the sensitivity of the device and tends to indicate an average value for the force exerted on the end plates 16 and 17. In FIG. 2 a plurality of piezoelectric annular rings 38 is shown connected in series. The output of the series connected piezoelectric elements 38 is in turn connected to a conventional amplifier circuit 40 which may be designed to provide a signal necessary for the operation of a utilization device 42, such as an electric meter.

Figure 7:
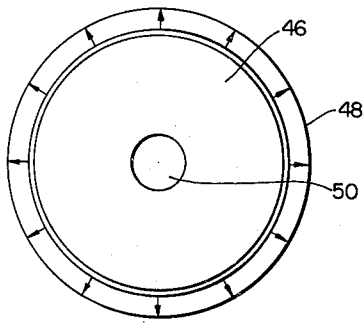
FIGS. 7 and 8 are plan views employed in explaining the action of the force-responsive device shown in FIG. 6.

Referring now to FIGS. 6 and 7, one embodiment of a force-transducing element 44 suitable for use in the force-measuring device is shown. A force-sensing element in the form of a solid elastic cylindrical body 46 supports a pair of piezoelectric annular rings 48 and 49. The cylindrical body 46 also serves to transmit forces received at its ends to the annular rings 48 and 49 in the form of radial forces. The cylindrical body 46 is provided with a hole 50 extending along its axis. The hole 50 is threaded at both ends thereof for receiving the screws 32. The entire surface of the cylindrical body 46 is anodized to help prevent electrical continuity between the cylindrical body 46 and any adjacent conducting bodies. With this arrangement all of the annular crystals float electrically with respect to the rest of the device.

The conversion of axial compressive forces applied to the ends of the solid cylindrical body 46 to the annular rings 48 and 49 into radial forces has been described above. For the purpose of this explanation it will be assumed that a tubular body behaves enough like a solid cylindrical body so that the explanation given above respecting radial expansion in response to axial forces is substantially correct.

The annular rings 48 and 49 are bonded to the cylindrical body 46 by an epoxy cement which is cured in place at elevated temperatures, which are, well below the Curie point of the material composing the annular rings 48 and 49. In FIG. 7 the arrows show the direction of the force exerted by the cylindrical body 46 on the annular rings 48 and 49 when the cylindrical body is subjected to a compression force.

Figure 9:
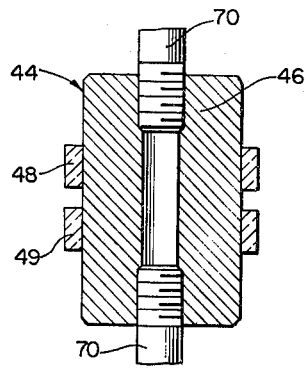
FIG. 9 is a side view partly in cross-section of an alternative embodiment of the invention.
Figure 8:
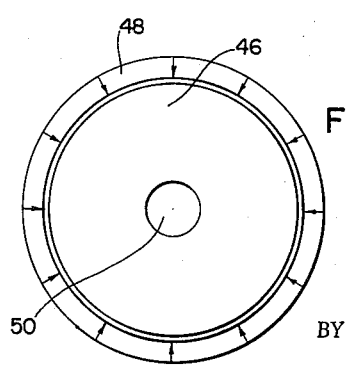

While the force measuring devices illustrated in FIGS. 2, 3, 4, 5, and 6 are most suitable for use in detecting compressive forces, they may be modified in ways that will be obvious to those skilled in the art to facilitate the measurement of tension forces. More particularly, a cylindrical body 46 bearing two annular crystals as described above may be fastened between two tension rods 70 as shown in FIG. 9 for the measurement of tension forces applied to the ends of the rods. More particularly, for example, the two tension rods 70 may be connected within a span of a cable whose tension is to be measured. In FIG. 8 the arrows show the direction of the force exerted by the cylindrical body 46 on the annular rings 48 and 49 when for some reason the cylindrical body 46 is subjected to tension.

In order to make it possible for the force-measuring device to detect both compressional forces and tensional forces, the annular rings 48 and 49 are preloaded on the cylindrical body and are cemented rigidly in place by means of cured epoxy cement. The preloading may be achieved, for example, by making the cylindrical bodies 46 slightly oversized and heating the annular rings 48 and 49 to an elevated temperature below the Curie point while they are being forced into position of the cylindrical body. Other ways of preloading the annular rings will readily occur to those skilled in the art. It is important to employ preloading when the stresses applied to the bonding cement may exceed the strength of the cement.

The electro-sensitive bodies, annular rings 48 and 49 may be of barium titanate or lead metaniobate. The inner and outer surfaces of the annular rings 48 and 49 are each coated with a thin layer of silver or other electrically conducting material so that electrical connection may be made to the inner and outer surfaces of the rings. Electrical connection to the inner surface may be made by coating a small area of a transverse surface at one end of the cylindrical body 46 with a conducting material forming a terminal such that an electrical conductor connected to the terminal may be effectively connected to the inner surfaces of the annular rings 48 and 49. The annular rings 48 and 49 are made thin since the materials are easier to polarize in thin bodies and since uniform tension is easier to achieve in a ring when the ring is thin. By a thin ring is meant one in which the annular thickness of the ring is less than about one-fifth of the external radius.

The piezoelectric annular rings 48 and 49 may be manufactured by mixing barium titanate with suitable additional agents for the purpose of making a working mixture, and then by pressing the mixture into the annular shape to be employed in the invention. The mixture is then fired at an elevated temperature to produce a dense ceramic material. After cooling, electrodes are formed on the two cylindrical surfaces of each ring, such as by plating those surfaces with silver. The rings are then radially polarized such as by applying a voltage between the cylindrical electrodes while the temperature of the ceramic is raised above the transformation or Curie temperature. The polarization may be accomplished by maintaining the polarizing voltage across the ceramic as the ceramic body is allowed to cool naturally to room temperature. The resulting ceramic has the characteristic of responding to radially applied forces, i.e., application of a force to the inner or outer surface of the ceramic annular ring 48 will produce a voltage between the electrodes on the inner and outer surfaces. As has been stated, other materials may be used to manufacture elements having the desired radial polarization and response to radial forces.

Where a pair of piezoelectric rings are mounted on a cylindrical body 46, the radial polarization of the two rings may both be in the same direction or they may be in the opposite direction. In the first instance, the polarization of the two rings is said to be parallel, in the latter, antiparallel. In either event, the two rings on each cylindrical body 46 are electrically connected in series in such a way that the electric fields developed in them in response to an axial force applied to the cylindrical body are added.

In the arrangement represented in FIG. 6, the inner electrode of the upper annular ring 48 is electrically connected by means of a wire 51 to the outer electrode of the lower annular ring 49, while the outer electrode of the upper annular ring 48 is connected to the wire 52 and the inner electrode of lower annular ring 49 is connected to the conductor 55. In this way, each pair of rings is connected in series relationship. In addition, the three pairs of rings are electrically connected together in series as schematically illustrated in FIG. 2.

Figure 10:
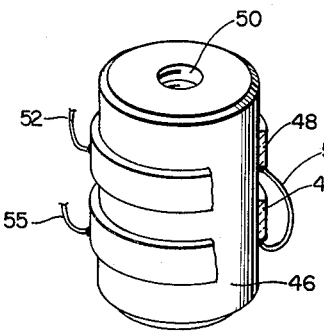
FIG. 10 is a cut-a-way perspective view of an alternative embodiment of the invention.

But in the arrangement illustrated in FIG. 10, the two inner electrodes of the annular rings 48 and 49 are electrically connected together by means of a wire 51 and the two outer electrodes of the two rings 48 and 49 are connected respectively to the two conductors 52 and 55. The arrangement employed in FIG. 6 is suitable for use where the polarization of the two crystals is parallel while that represented in FIG. 10 is suitable for use where the directions of polarization of the two crystals are antiparallel.

Figure 11:
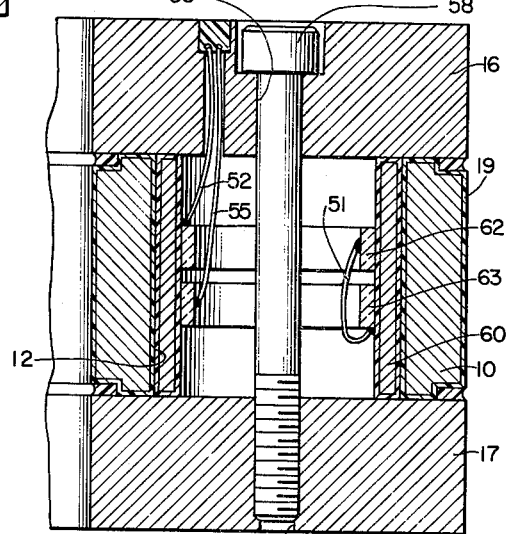
FIG. 11 is a vertical sectional view of a portion of an alternative embodiment of the invention.

FIG. 11 illustrates another embodiment of the present invention. In this embodiment, a recess 56 is provided in each of the end plates 16 and 17. However, end plate 16 is provided with an enlarged portion for receiving the head of a screw 58, and end plate 17 is provided with a threaded aperture for receiving the threaded end of the screw 58. A cylindrical body 60 serves the same force transmitting function as the cylindrical body 46 in FIG. 5. In this case also compressive forces applied to the ends of the cylindrical body 60 will result in an outward expansion of the cylindrical body. To detect such expansion, annular rings 62 and 63 are cemented in place on the inside of the cylindrical body 60. The entire surface of the cylindrical body 60 is anodized, as before, to prevent undesired electrical continuity. In this case, tightening of the screw 58 causes a compressive force to be applied to the cylindrical body 60 and the spacer 10. It is not necessary to employ a separate cylinder 60 on which to mount the annular crystals 62 and 63. Instead, the crystals may be mounted on the inner walls of the cylindrical cavities and concentric therewith.

In both embodiments of the present invention, application of compressive forces to the end plates 16 and 17 of the force measuring device results in the transmission of such forces to the piezoelectric annular rings in the form of radially acting forces which produce corresponding electrical signals.

With a spacer 10 having a large cross section compared with the cross sections of the force-sensing elements, a large fraction of the force applied to the end plates is applied to the spacer and only a small fraction is applied to the force-sensing elements. By thus sharing the applied force between a spacer and the force-sensing elements, larger forces may be measured than otherwise.

While the invention has been described in relationship to a concentric arrangement of an annular piezoelectric ring mounted on a circular cylinder, in another aspect of the invention, a crystal segment is bonded to an elastic body which is subjected to strain in a direction parallel to its surface. In this arrangement, electrical forces are developed in the piezoelectric element when the elastic body is subjected to a force parallel to its surface, thus causing such strain. It will be understood that when the body is strained by such a force it applies a strain to the crystal element bonded thereto, thus causing that crystal to develop electric forces in proportion to the strain, provided that the axis of the crystal and the electrodes on the crystal are suitably oriented relative to each other and to the direction of strain. By way of example, instead of employing an annular ring the invention may be practiced by employing a series of arcuate segments bonded to the cylindrical post and the segments on any post may be connected in parallel.

From the foregoing description it is apparent that a force transducer has been provided which achieves the objects of this invention. Although only three particular forms of the invention have been specifically disclosed, it is obvious that the invention is not limited thereto, but is capable to a variety of mechanical embodiments. Various changes which will now suggest themselves to those skilled in the art which may be made in the material, form, details of construction and arrangement of the elements without departing from the invention. Thus, the crystal might be polarized in other directions and the electrodes might be differently arranged thereon. In one alternate arrangement the annular crystal is polarized axially and mutually insulated electrodes are plated on the upper and lower surfaces that are transverse to the axis. Reference is therefore to be had to the appended claims to ascertain the scope of the invention.

The invention claimed is:
1. A force transducing element comprising
a solid elastic cylindrical body member that is adapted to receive an axial force applied to the ends thereof and responsive to said force to change the radial dimension of the body as an inverse function of the change in axial length, said cylindrical body member having a cylindrical recess formed therein;

a polarized piezoelectric ring comprising an annular member having a pair of concentric cylindrical surfaces, said polarized piezoelectric ring being mounted within said cylindrical recess with the outer cylindrical surface of said annular member in intimate contact with the wall of said body member in said cylindrical recess, said ring pressing radially against said wall of said body member as said radial dimension of said body member changes whereby electric signals are developed between spaced apart areas of said ring in accordance with the magnitude of the axial force applied to said cylindrical body member;

and electrodes connected to said ring at said spaced apart areas for detecting said electrical signals developed in said ring by the application of an axial force to said body member.

2. A force transducing element comprising a solid elastic cylindrical body member that is adapted to receive an axial force applied to the ends thereof and responsive to said force to change the radial dimension of the body as an inverse function of the change in axial length;

a radially polarized piezoelectric ring mounted on the cylindrical surface of said cylindrical body member between the ends thereof, said ring being in intimate contact with said body member and being preloaded to produce a circumferential force in said ring whereby said ring presses radially against said cylindrical surface of said body member both when no axial force is applied to said body member and when an axial force is applied to said body member whereby electric signals are developed between spaced apart areas of said ring in accordance with the magnitude of the axial force applied to said cylindrical body member;

and electrodes connected to the inner and outer cylindrical surfaces of said ring at said spaced apart areas for detecting said electrical signal developed piezoelectrically in a radial direction of said annular member by the application of an axis force to said body member.

3. A force-measuring transducer comprising a cylindrical member having a plurality of axially extending cavities formed therein, a pair of cylindrical end plates mounted at the respective ends of said cylindrical member, and a plurality of force-sensitive elements, each being mounted within one of said cavities and secured to said end plates and comprising a solid elastic cylindrical body adapted to receive forces applied at the ends thereof by said end plates and responsive to said forces by changing dimensions radially in proportion to said forces, and an electrosensitive annular ring mounted on each of said cylindrical bodies and concentric therewith, each of said annular rings being responsive to forces applied radially thereto for providing electrical signals proportional to said axial forces.

4. A force-measuring transducer as specified in claim 3 comprising an electrical connector projecting radially laterally from said transducer, and providing a pair of electrical terminals, one of said end plates being provided with an external groove extending along a path in said end plate that lies in positions adjacent the axes of said cylindrical bodies, said one plate being provided with a plurality of passages extending from said groove into the respective cavities within which the respective cylindrical bodies are mounted, and electrical conductors lying within said groove and connecting said annular rings in series between said two terminals.

References Cited by the Examiner

UNITED STATES PATENTS

| | | | |
|---|---|---|---|
| 2,488,347 | 11/49 | Thurston | 73—141 X |
| 2,493,029 | 1/50 | Ramberg | 73—141 X |
| 2,725,548 | 11/55 | Harris | 73—398 X |
| 2,767,974 | 10/56 | Ballard et al. | |
| 2,795,709 | 6/57 | Camp | 310—9.6 |
| 2,836,738 | 5/58 | Crownover | 310—8 X |
| 2,920,880 | 1/60 | Laycock | 73—141 X |
| 2,947,823 | 8/60 | Harris | 73—67 X |
| 3,060,731 | 10/62 | Adise | 73—141 |
| 3,068,446 | 12/62 | Ehrlich et al. | 310—9.6 X |

FOREIGN PATENTS

| | | |
|---|---|---|
| 216,248 | 7/61 | Austria. |
| 608,157 | 11/60 | Canada. |
| 221,974 | 9/42 | Switzerland. |

RICHARD C. QUEISSER, *Primary Examiner.*

ROBERT L. EVANS, *Examiner.*